United States Patent
Chung et al.

(10) Patent No.: US 10,198,387 B2
(45) Date of Patent: Feb. 5, 2019

(54) ELECTRONIC DEVICE AND METHOD FOR CONTROLLING SIGNAL STRENGTH ACCORDING TO MODE

(71) Applicant: Samsung Electronics Co., Ltd., Suwon-si, Gyeonggi-do (KR)

(72) Inventors: Il-Hyung Chung, Osan-si (KR); Cheol-Ho Lee, Suwon-si (KR); Dong-Ho Yu, Yongin-si (KR); Dae-Woong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 15/163,310

(22) Filed: May 24, 2016

(65) Prior Publication Data

US 2016/0378705 A1    Dec. 29, 2016

(30) Foreign Application Priority Data

Jun. 26, 2015    (KR) .......................... 10-2015-0091524

(51) Int. Cl.
*G06F 3/00* (2006.01)
*G06F 13/38* (2006.01)
*G06F 13/40* (2006.01)
*G06F 5/06* (2006.01)
*G06F 9/4401* (2018.01)
*G06F 13/42* (2006.01)

(52) U.S. Cl.
CPC .............. *G06F 13/385* (2013.01); *G06F 5/06* (2013.01); *G06F 9/4411* (2013.01); *G06F 13/4068* (2013.01); *G06F 13/4282* (2013.01)

(58) Field of Classification Search
CPC ...... G06F 5/06; G06F 9/4411; G06F 13/4282; G06F 13/385; G06F 13/4068
USPC .......................................................... 710/14
See application file for complete search history.

(56) References Cited

U.S. PATENT DOCUMENTS 8,924,598 B1    12/2014  Castleberry et al.
9,395,780 B2 *   7/2016  Considine ........... G06F 13/4081
(Continued)

FOREIGN PATENT DOCUMENTS

| | | |
|---|---|---|
| JP | 2006-500679 A | 1/2006 |
| KR | 10-2012-0019188 A | 3/2012 |
| KR | 10-2013-0078660 A | 7/2013 |

OTHER PUBLICATIONS

Universal Serial Bus Specification Rev, 2.0, published, Apr. 27, 2000.
(Continued)

*Primary Examiner* — Chun Kuan Lee
(74) *Attorney, Agent, or Firm* — Jefferson IP Law, LLP (57) ABSTRACT

An electronic device and a method for changing modes according to external devices connected through a universal serial bus (USB) and controlling the strength of signals communicated according to changed modes are provided. The method includes detecting a connection with an external device corresponding to booting of the electronic device, determining a mode of the electronic device according to the detected connection with the external device, varying a characteristic setting of an input output (IO) buffer to a certain strength corresponding to the determined mode, and communicating a signal at a strength corresponding to the varied setting.

18 Claims, 3 Drawing Sheets

(56) References Cited

U.S. PATENT DOCUMENTS

| | | |
|---|---|---|
| 9,584,385 B2* | 2/2017 | Lee .................... H04L 43/0852 |
| 2002/0169915 A1 | 11/2002 | Wu |
| 2005/0249143 A1 | 11/2005 | Tee et al. |
| 2012/0265911 A1 | 10/2012 | Connolly |
| 2012/0271979 A1 | 10/2012 | Considine et al. |
| 2015/0253842 A1* | 9/2015 | Murata ................ G06F 1/3287 |
| | | 713/323 |

OTHER PUBLICATIONS

On-The-GO Supplement to the USB 2.0 Specification, Rev. 1.0a, Jun. 24, 2003.

* cited by examiner

ELECTRONIC DEVICE AND METHOD FOR CONTROLLING SIGNAL STRENGTH ACCORDING TO MODE

CROSS-REFERENCE TO RELATED APPLICATION(S)

This application claims the benefit under 35 U.S.C. § 119(a) of a Korean patent application filed on Jun. 26, 2015 in the Korean Intellectual Property Office and assigned Serial number 10-2015-0091524, the entire disclosure of which is hereby incorporated by reference.

TECHNICAL FIELD

The present disclosure relates to electronic devices. More particularly, the present disclosure relates to electronic devices and methods for changing modes according to external devices connected through a universal serial bus (USB) and controlling the characteristics of signals communicated according to changed modes.

BACKGROUND

Generally, an electronic device (e.g., a personal computer (PC) or portable terminal) has an interface for data communication with an external electronic device. As a representative example, an electronic device may have a universal serial bus (USB) terminal and may communicate data with an external electronic device through the USB or a wireless communication module (e.g., a Wi-Fi or Bluetooth). Electronic devices (or external devices) having USB terminals may include host mode-dedicated devices, such as personal computers, device mode-dedicated devices, such as USB memories, and on-the-go devices that operate in one mode of a host mode and a device mode according to connections, such as tablet PCs or smartphones.

USB has been developed to provide an enhanced and easy-to-use interface while allowing users of electronic devices including PCs to connect with peripheral devices positioned away at various distances. USB has been initially developed considering laptop computers and this have made significant contributions to connectors for small peripheral devices. Among others, USB may advantageously reduce a tangle of cables that may have an influence on the installation of a mini computer.

USB has been a selective interface for electronic devices including PCs because it provides a simplified connection to users. USB eliminates the need of other connectors for printers, keyboards, mouses, or other peripheral devices and may support a wide range of data types from slow mouse inputs to digitalized audios and compressed videos.

Today's USB devices communicable with a host computer system on USB include USB printers, scanners, digital cameras, storage devices, and card readers. A USB-based system may request that a USB host controller be present in a host system and that the operating system (OS) of the host system support USB and USB mass storage class devices. USB devices may perform communication at low speed, full speed, high speed, and super speed through USB buses. Connections between a USB device and a host include a power line, a ground line, and two pairs of data lines (TX+, TX−, RX, and RX−). When the USB device is connected to the host, the USB device determines an operation speed using a pull-up resistor on the D+ line. When the USB device operates at full speed, high speed, or super speed, the D+ line (the D− line if the device is a low-speed device) turns up to high. The USB device then removes the pull-up resistor in an electronic manner and continues to communicate at high speed.

The electronic device may connect with an external device (e.g., a PC, smartphone, or USB memory) via USB to communicate data or power. As such, when the electronic device connects with the external device via USB, the electronic device may operate in a host mode (or master mode) or device mode (or slave mode). When two devices are connected via USB, one of the devices operates in the host mode, and the other operates in the device mode. A normal electronic device plays a fixed role in the host mode or device mode depending on its unique characteristics. For example, a PC operates always in the host mode, and a USB memory always in the device mode. A USB connection requires a pair of one host-mode electronic device and one device-mode electronic device. When host-mode electronic devices are connected together or device-mode devices connect together, the USB operation cannot be done normally. In order to prevent wrong connections and to allow the user to make a connection between a pair of host-mode device and device-mode device, the USB specifications distinctively define the USB connector architecture as shown in the following table.

For example, a host-mode device has a standard-A connector, and a device-mode device has a standard-A plug so that the host-mode device and the device-mode device can make a connection therebetween, but a device-mode USB device having a Standard-B connector cannot be coupled with a device-mode USB device having a standard-A plug. The following Table 1 represents the connector-plug matching between USB electronic devices.

TABLE 1

| Receptacle (Standard or PD) | Plugs Accepted (Standard or PD) |
| --- | --- |
| USB 2.0 Standard-A | USB 2.0 Standard-A or USB 3.1 Standard-A |
| USB 3.1 Standard-A | USB 3.1 Standard-A or USB 2.0 Standard-A |
| USB 2.0 Standard-B | USB 2.0 Standard-B |
| USB 3.1 Standard-B | USB 3.1 Standard-B or USB 2.0 Standard-B |
| USB 2.0 Micro-B | USB 2.0 Micro-B |
| USB 3.1 Micro-B | USB 3.1 Micro-B or USB 2.0 Micro-B |
| USB 2.0 Micro-AB | USB 2.0 Micro-B or USB 2.0 Micro-A |
| USB 3.1 Micro-AB | USB 3.1 Micro-B, USB 3.1 Micro-A, USB 2.0 Micro-B, or USB 2.0 Micro-A |

A device that is fixed to operate in the host mode, such as a PC, is designed to have a standard-A connector, and a USB device fixed to operate in the device mode, such as a USB printer, is designed to have a Type-B (Standard-B or micro-B) connector.

However, some electronic device, such as tablet PC or phone, need selectively have the host mode function and device mode function depending on a counterpart device connected thereto. In such case, when the electronic device has a micro-AB connector, it may support both a host mode device having a micro-A plug and a device mode device having a micro-B plug.

The USB specifications define such function as the on-the-go (OTG) mode at which one of the host mode and the device mode may be variable selected depending on the counterpart device connected with the USB device or user scenarios. A USB device supporting the OTG function physically supports the micro-AB connector to allow for equipment of both the micro-B plug of the host mode device and the micro-A plug of the device mode device and electrically has an identifier (ID) signal in the USB connector so that when the ID signal is equal to or less than a certain voltage, it operates in the host mode, and when the ID signal is equal to or greater than the certain voltage, it operates in the device mode. As such, the functions of the USB device may be variable defined. For example, for a portable terminal supporting the OTG function, when the portable device is connected with an electronic device, such as a PC, through a normal cable to which no ID signal is connected, the portable terminal operates in the device mode and is thus recognized merely as a memory, and when the portable terminal is connected with a USB memory via an OTG cable or OTG gender whose IP pin is connected to a ground, it operates as a USB device having a host mode function. The OTG gender is a middle adapter to physically connect a device mode-dedicated USB device to an electronic device supporting both the host mode and the device mode.

When an electronic device of the related art communicates signals with an external device connected via USB, the electronic device communicates signals at the same signal strength in the host mode and device mode, and thus, the USB connection (or recognition or data communication) experiences problems with excessive signal strength.

The above information is presented as background information only to assist with an understanding of the present disclosure. No determination has been made, and no assertion is made, as to whether any of the above might be applicable as prior art with regard to the present disclosure.

SUMMARY

Accordingly, there is a need for providing the optimal performance by adjusting characteristic register settings of the input output (IO) buffer when signal communication with an external device is performed according to modes of an electronic device. Aspects of the present disclosure are to address at least the above-mentioned problems and/or disadvantages and to provide at least the advantages described below. Accordingly, an aspect of the present disclosure is to provide electronic devices and methods for changing modes according to external devices connected through a universal serial bus (USB) and controlling the characteristics of signals communicated according to changed modes.

In accordance with an aspect of the present disclosure, a method for controlling the strength of signals communicated according to changed modes is provided. The method includes detecting a connection with an external device corresponding to booting of the electronic device, determining a mode of the electronic device according to the detected connection with the external device, varying a characteristic setting of an IO buffer to a certain strength corresponding to the determined mode, and communicating a signal at a strength corresponding to the varied setting.

In accordance with another aspect of the present disclosure, an electronic device for controlling a signal strength according to a mode is provided. The electronic device includes a transmission/reception unit including an interface connecting with an external device and a controller configured to detect a connection with the external device corresponding to booting of the electronic device, determine a mode of the electronic device according to the detected connection with the external device, vary a characteristic setting of an IO buffer to a certain strength corresponding to the determined mode, and communicate a signal through the interface at a strength corresponding to the varied setting.

According to various embodiments of the present disclosure, an electronic device and a method for changing modes according to an external device connected via USB and controlling the strength of signals communicated according to the changed modes, providing the optimal performance by adjusting the characteristic register settings of the IO buffer when an electronic device communicates signals with an external device according to its modes, are provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof As used herein, the term "and/or" includes any and all combinations of one or more of the above-listed items. For examples, "A or B" may include A, or include B, or include both A and B.

Ordinal numbers as herein used, such as "first", "second", and the like, may modify various components of various embodiments of the present disclosure, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

Unless otherwise defined, all terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, examples of the electronic device may include, but is not limited to, a smartphone, a tablet personal computer (PC), a mobile phone, a video phone, an e-book reader, a desktop PC, a laptop computer, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device (e.g., a head-mounted device (HMD), electronic clothes, an electronic bracelet, an electronic necklace, an electronic appcessory, an electronic tattoo, a smart watch, and the like).

According to an embodiment of the present disclosure, the electronic device may be a smart home appliance. For example, examples of the smart home appliance may include, but is not limited to, a television (TV), a digital versatile disc (DVD) player, an audio player, a refrigerator, an air conditioner, a vacuum cleaner, an oven, a microwave oven, a washer, a dryer, an air cleaner, a set-top box, a TV box (e.g., a device capable of receiving and outputting broadcast signals), a gaming console, an electronic dictionary, a camcorder, or an electronic picture frame.

According to an embodiment of the present disclosure, examples of the electronic device may include, but is not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller's machines (ATMs), or point of sales (POS) devices.

According to various embodiments of the disclosure, examples of the electronic device may include, but is not limited to, part of furniture or building/structure with a biometric function, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible device. According to an embodiment of the present disclosure, the electronic device is not limited to the above-listed devices.

Various embodiments of the present disclosure are now described with reference to the accompanying drawings. As used herein, the term "user" may denote a human or another device using the electronic device.

Figure 1A:
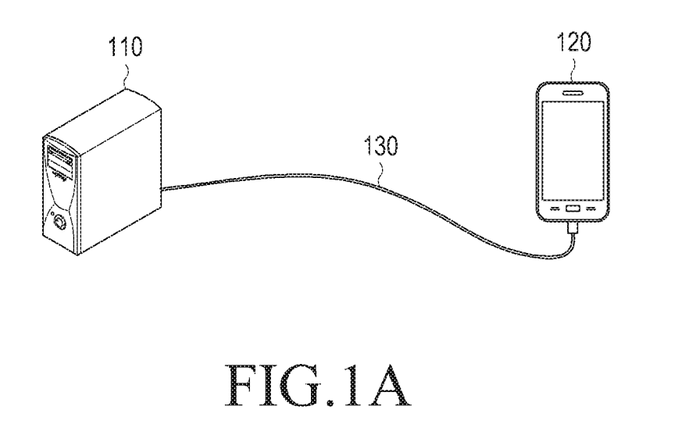
FIG. 1A illustrates an electronic device connected with a personal computer (PC) via a universal serial bus (USB) cable according to an embodiment of the present disclosure.
Figure 1B:
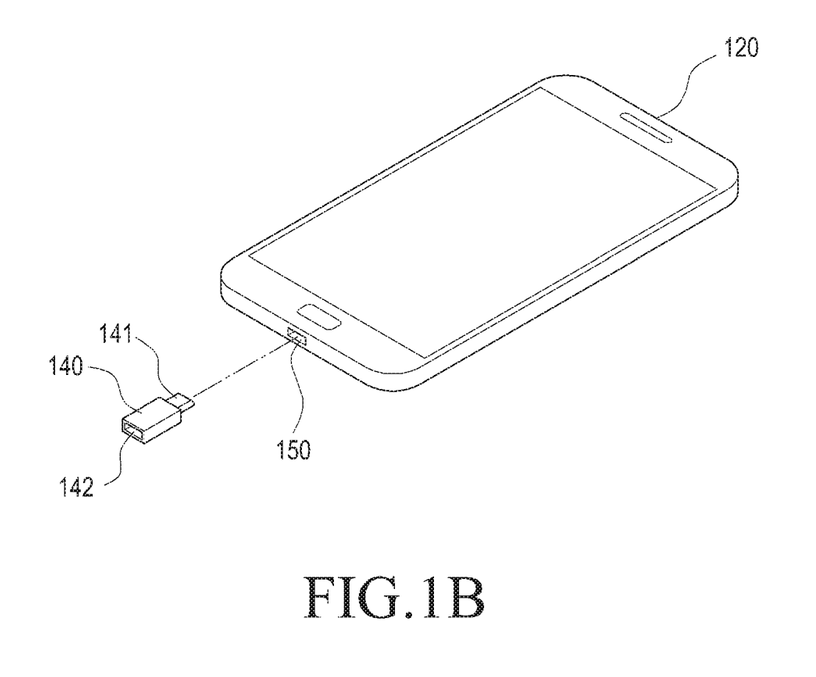
FIG. 1B illustrates a connection between an electronic device and an on-the-go (OTG) gender according to an embodiment of the present disclosure.

FIG. 1A illustrates an electronic device connected with a PC via a universal serial bus (USB) cable according to an embodiment of the present disclosure. FIG. 1B illustrates a connection between an electronic device and an on-the-go (OTG) gender according to an embodiment of the present disclosure.

Referring to FIG. 1A, according to an embodiment of the present disclosure, an electronic device 120 may be connected with a PC 110 via a USB cable 130. The PC 110 may include a plurality of USB ports. The electronic device 120 may configure a USB 2.0 port or a USB 3.0 port or both a USB 2.0 port and a USB 3.0 port depending on types. Such USB port may be configured with four terminals, but not limited thereto and may be configured with a plurality of terminals.

The PC 110 detects the USB cable connection with the electronic device 120 and may control switching between a plurality of lines included in the cable corresponding to the detection. The PC 110 may provide power to the electronic device 120 via at least two lines corresponding to the controlled switching Both ends of the USB cable 130 may be configured of USB terminals. The USB cable 130 include a positive data line (D+), a negative data line (D−), a voltage bus (VBUS) line, and a ground (GND) line, and the lines are connected with their corresponding lines of the electronic device 120. The voltage bus line is a line outputting a voltage from a charger, the positive data line (D+) and the negative data line (D−) may transmit signals (or data), and the ground line (GND) may be connected to a ground potential or other ground source.

Referring to FIG. 1B, according to an embodiment of the present disclosure, the electronic device 120 may include a connector that may be coupled to a terminal 141 of an OTG gender 140. The connector may be configured in a connection unit 150. The OTG gender 140 may include a socket 142 where a USB memory (not shown) may be mounted.

When the USB memory is mounted in the USB socket 142, and, the terminal 141 of the OTG gender 140 is mounted into the connection unit 150 of the electronic device, the electronic device 120 may recognize the mounting of the OTG gender 140 and recognize the USB memory. The connection unit 150 of the electronic device may configure a USB 2.0 port or a USB 3.0 port or both a USB 2.0 port and a USB 3.0 port depending on the type of the electronic device.

Figure 2:
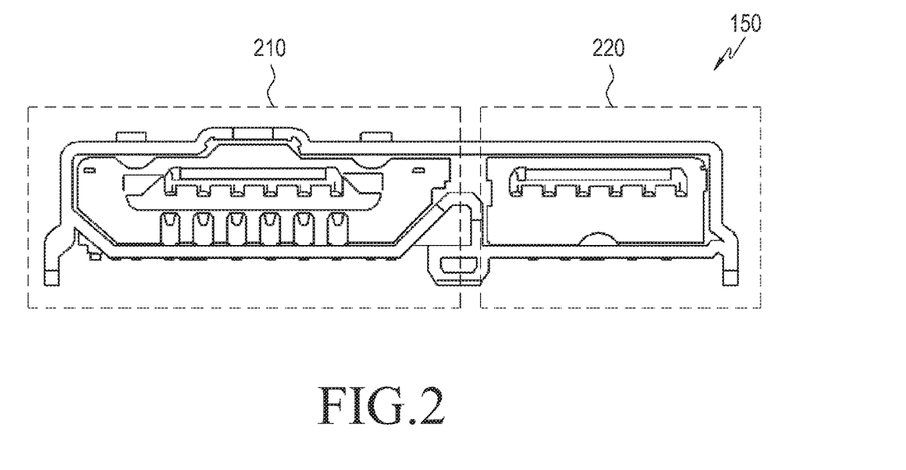
FIG. 2 illustrates a connection unit of an electronic device according to an embodiment of the present disclosure.

FIG. 2 illustrates a connection unit of an electronic device according to an embodiment of the present disclosure.

Referring to FIG. 2, according to an embodiment of the present disclosure, the USB connection unit 150 may include a USB 2.0 compatible part 210 and a USB 3.0-dedicated expanded part 220. The USB connection unit 150 provides the USB 2.0-compatible part 210 and the USB 3.0-dedicated expanded part 220 to remain compatible with USB 3.0 and USB 2.0 and may thus provide connection with at least one of USB 3.0 and USB 2.0. The USB connection unit 150 may be positioned in the center of a lower portion of the electronic device according to recent design trends.

The USB connection unit 150 may include a VBUS pin, a DATA− pin, a DATA+ pin, an OTG identifier (ID) pin, and a GND pin. The USB connection unit 150 receives power (e.g., 5V) from an external source via the VBUS pin. The GND pin is a pin for grounding the power source, and the DATA− pin and DATA+ pin are differential-type data pins. The OTG ID pin is a pin for selecting a host (or master) mode or a device (or slave) mode.

Figure 3:
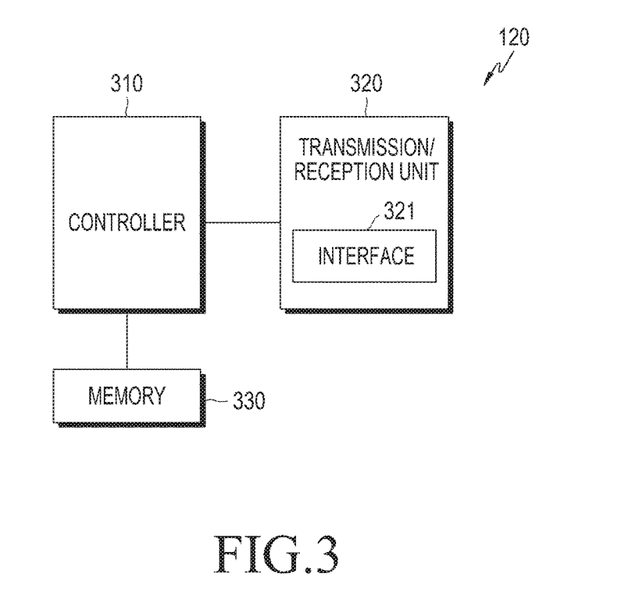
FIG. 3 is a block diagram illustrating an electronic device controlling a strength of signals according to modes according to an embodiment of the present disclosure.

FIG. 3 is a block diagram illustrating an electronic device controlling a strength of signals according to modes according to an embodiment of the present disclosure.

Referring to FIG. 3, according to an embodiment of the present disclosure, the electronic device 120 controlling the strength of signals according to modes may include a transmission/reception unit 320 including a USB interface 321, a memory 330, and a controller 310.

For example, the transmission/reception unit 320 may configure communication between the electronic device 120 and an external device. For example, the transmission/reception unit 320 may be connected with the USB cable 130 via wireless or wired communication to communicate with the PC 110. The transmission/reception unit 320 may include the USB connection unit 150 and may further include at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The transmission/reception unit 320 may include, e.g., short-range communication. The short-range communication 164 may include at least one of Wi-Fi, Bluetooth, near-field communication (NFC), or global navigation satellite system (GNSS). The interface 321 may serve as an interface that may, e.g., transfer commands or data input from a user or other external devices to other component(s) of the electronic device 120. Further, the interface 321 may output commands or data received from other component(s) of the electronic device 120 to the user or the other external device.

The memory 330 may include a volatile and/or non-volatile memory. For example, the memory 330 may store commands or data related to at least one other component of the electronic device 120. According to an embodiment of the present disclosure, the memory 130 may store software and/or a program. The program may include, e.g., a kernel, middleware, an application programming interface (API) and/or an application program (or an application). At least a portion of the kernel, middleware, or API may be denoted an operating system (OS). The memory 330 may store a table including strengths determined according to modes of the electronic device 120. The memory 330 may store a table including driver strengths, pre-emphasis values, and sensitivity values for applying to signals communicated when the electronic device 120 operates in the device mode. Further, the memory 330 may store a table including driver strengths, pre-emphasis values, and sensitivity values for applying to signals communicated when the electronic device 120 operates in the host mode. The table is as shown in the following Table 2.

TABLE 2

| signal setting | device mode | host mode |
| --- | --- | --- |
| Driver Strength (TX) | 5 (strong) | 3 (weak) |
| Pre-emphasis value (TX) | 5 (strong) | 3 (weak) |
| Sensitivity value (RX) | 3 (weak) | 5 (strong) |

Table 2 shows degrees of USB mode connection and signal settings in the electronic device according to an embodiment of the present disclosure. The electronic device 120 may have different configurations of USB signal setting methods depending on whether it is in the device mode or host mode. By making the setting methods different, an optimal setting method may be provided according to signal losses by the cable.

When the electronic device 120 is connected with the PC 110 via the USB cable 130, the electronic device 120 may be operated in the device mode. In this case, the electronic device 120 may adjust the characteristic settings of the input output (IO) buffer for communicating signals (or data) with the PC 110. The electronic device 120 may set the driver strength to 5, the pre-emphasis value to 5, and the sensitivity value to 3. When the electronic device 120 is connected with the OTG gender 140, the electronic device 120 may be operated in the host mode. In this case, the electronic device 120 may adjust the characteristic settings of the IO buffer for communicating signals (or data) with the memory (not shown) mounted in the OTG gender. The electronic device 120 may set the driver strength to 3, the pre-emphasis value to 3, and the sensitivity value to 5.

The controller 310 may include one or more of a central processing unit (CPU), an application processor (AP), or a communications processor (CP). The controller 310 may perform control on at least one of the other components of the electronic device 120, and/or perform an operation or data processing relating to communication.

The controller 310 may detect the booting of the electronic device 120. The controller 310 may detect a connection with an external device corresponding to the booting of the electronic device, determine a mode of the electronic device according to the detected connection with the external device, varies the characteristic setting of the IO buffer to a certain strength corresponding to the determined mode, and communicate signals through the interface at the strength corresponding to the varied setting.

The controller 310 may determine the voltage level of a USB ID signal of the electronic device. The controller 310, when the USB ID signal is electrically equal to or greater than a certain voltage, may determine that the electronic device 120 is in the device mode, and in this case, the external device may include a PC. When the USB ID signal is equal to or less than the certain voltage or when an ID signal of the external device is connected to the ground, the controller 310 may determine that the electronic device is in the host mode, and in this case, the external device may include an OTG gender. The controller 310, when the electronic device 120 is in the device mode, may adjust the strength of communicated signals with a certain setting value. When the electronic device 120 is in the host mode, the controller 310 may adjust the strength of communicated signals with a predefined setting value. This value may be adjusted to be different from the strength when the electronic device is in the device mode. The controller 310 may adjust the strength of signal so that the strength of signal transmitted when the electronic device 120 is in the host mode is less than the strength of signal transmitted when the electronic device 120 is in the device mode. Further, the controller 310 may adjust the strength of signal so that the strength of signal received when the electronic device 120 is in the host mode is greater than the strength of signal received when the electronic device 120 is in the device mode.

Figure 4:
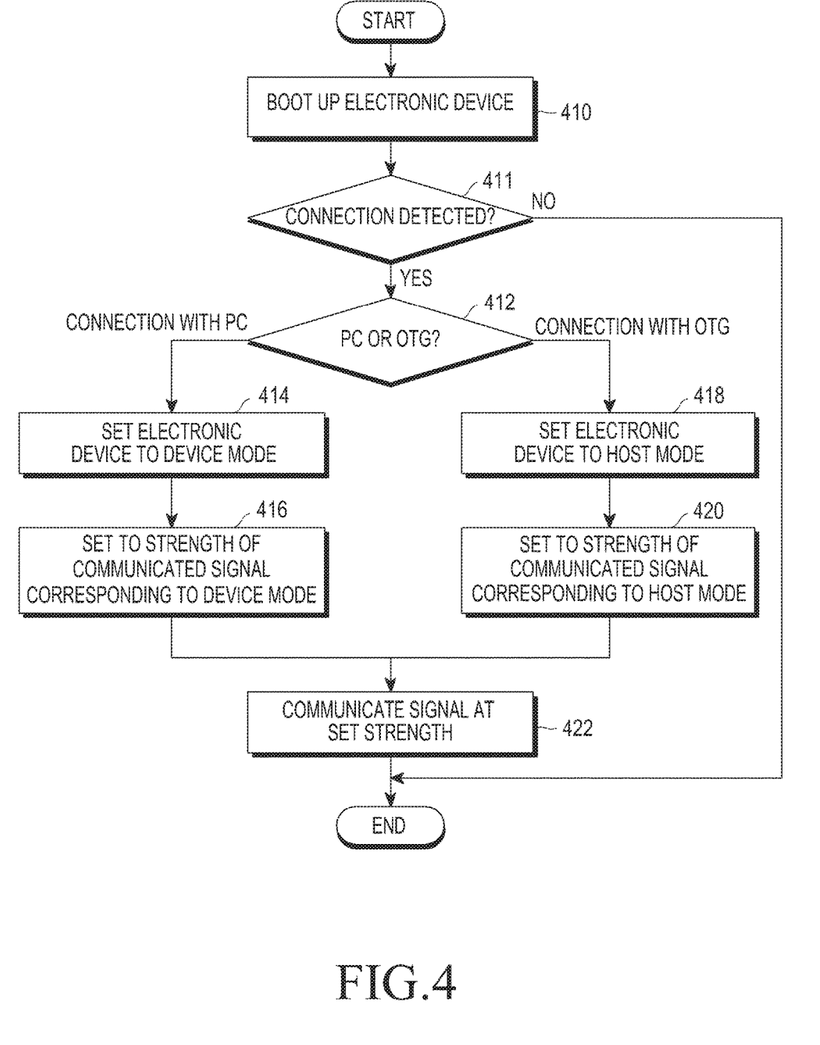
FIG. 4 is a flowchart illustrating a method for controlling a strength of signals according to modes of an electronic device according to an embodiment of the present disclosure.

FIG. 4 is a flowchart illustrating a method for controlling a strength of signals according to modes of an electronic device according to an embodiment of the present disclosure.

Hereinafter, a method for controlling signal strength according to modes of the electronic device is described below in detail with reference to FIG. 4 according to an embodiment of the present disclosure.

Referring to FIG. 4, when the electronic device 120 boots up at operation 410, the electronic device 120 may detect whether the USB cable is connected with the USB connection unit 150 at operation 411. When the electronic device 120 boots up, the electronic device 120 may detect whether the USB cable is connected with the USB connection unit 150 and may also detect whether an external device is connected with another terminal of the USB cable. The electronic device 120 may determine whether the external device connected with the other terminal of the USB cable is a PC or an OTG gender. The electronic device 120 may determine whether a USB ID signal is equal to or less than a certain voltage to determine whether the external device is in connection.

The electronic device 120 may determine whether the USB connection unit 150 is connected with the PC or the OTG gender at operation 412. The electronic device 120 may identify the voltage level of the USB ID signal, and when the voltage level is a certain voltage level or more, the electronic device 120 may determine that the electronic device 120 is connected with the PC via the USB cable. When connected with the PC via the USB cable, the electronic device 120 may set (or change) the current mode to the device mode (or slave mode). The electronic device 120 may identify the voltage level of the USB ID signal, and when the voltage level is at the certain voltage level or less, and the ID signal of the external device is connected with the ground, the electronic device 120 may determine that the electronic device 120 is in connection with the OTG gender via the USB cable. When connected with the OTG gender via the USB cable, the electronic device 120 may set (or change) the current mode to the host mode (or master mode).

When it is determined in operation 412 that the electronic device 120 is connected via the USB connection unit 150 with the PC, the electronic device 120 may be set to be in the device mode at operation 414. When the electronic device 120 is connected with the PC, the electronic device 120 may change the current mode to the device mode and operate as a protocol master.

The electronic device 120 may set the strength of communicated signal corresponding to the device mode at operation 416. When the current mode is changed to the device mode, the electronic device 120 may vary the driver setting to a certain strength corresponding to the varied mode. When the current mode is changed to the device mode, the electronic device 120 may adjust the strength of signal communicated with the PC in consistence with predefined characteristics. The electronic device 120 may vary the characteristic register of the IO buffer to adjust the same to be suited for the previously defined characteristics of signal communicated with the PC. The electronic device 120 may set the driver strength to 5, the pre-emphasis value to 5, and the sensitivity value to 3. The electronic device 120 may communicate signals by applying at least one of the set values to signals communicated with the PC. Each of the values may be adjusted by the PC environment, USB cable length or communication circumstances.

When it is determined in operation 412 that the electronic device 120 is connected via the USB connection unit 150 with the OTG gender, the electronic device 120 may be set to be in the host mode at operation 418. When the electronic device 120 is connected with the OTG gender, the electronic device 120 may change the current mode to the host mode.

The electronic device 120 may set the strength of communicated signal corresponding to the host mode at operation 420. When the current mode is changed to the host mode, the electronic device 120 may vary the driver setting to a certain strength corresponding to the varied mode. When the current mode is changed to the host mode, the electronic device 120 may adjust the strength of signal communicated with the USB memory connected thereto via the OTG gender. The electronic device 120 may set the driver strength to 3, the pre-emphasis value to 3, and the sensitivity value to 5. The electronic device 120 may communicate signals by applying at least one of the set values to signals communicated with the USB memory connected via the OTG gender. Each of the values may be adjusted by the connectivity environment and characteristics of the electronic device having the same device mode as that of the USB memory connected with the OTG gender.

The electronic device 120 may communicate signals at the set strength at operation 422. When the electronic device 120 is in the device mode, the electronic device 120 may vary the register of the driver to adjust the strength of signal communicated with the PC to be the same as the strength of signal communicated by the PC. After setting the driver strength to 5, the pre-emphasis value to 5, and the sensitivity value to 3, the electronic device 120 may communicate signals (or data) with the PC by applying at least one of the set values to signals communicated with the PC. When the electronic device 120 is in the host mode, the electronic device 120 may vary the register of the driver to adjust the strength of signal communicated with the USB memory connected via the OTG gender to be the same as the strength of signal communicated by the USB memory connected via the OTG gender. After setting the driver strength to 3, the pre-emphasis value to 3, and the sensitivity value to 5, the electronic device 120 may communicate signals (or data) with the memory of the OTG gender by applying at least one of the set values to signals communicated with the PC. Each of the values may be adjusted by the connectivity environment and characteristics of the electronic device having the same device mode as that of the USB memory connected with the OTG gender.

The term 'module' may refer to a unit including one of hardware, software, and firmware, or a combination thereof.

The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a signal strength according to a mode of an electronic device, the method comprising:
   detecting a connection with an external device corresponding to booting of the electronic device;
   determining a mode of the electronic device according to a type of the external device;
   varying a characteristic setting of an input output (I/O) buffer to a certain strength corresponding to the determined mode, wherein the characteristic setting of the I/O buffer includes a first characteristic element, a second characteristic element and a third characteristic element; and
   communicating a signal at a strength corresponding to the varied characteristic setting,
   wherein the first characteristic element is a driver strength for applying to a signal transmitted to the external device, the second characteristic element is a pre-emphasis value for applying to the signal transmitted to the external device, and the third characteristic element is a sensitivity value for applying to a signal received from the external device.

2. The method of claim 1, wherein the detecting of the connection with the external device comprises determining whether a voltage of a universal serial bus (USB) identifier (ID) signal of the electronic device is equal to or less than a certain voltage.

3. The method of claim 2, wherein the determining of the mode of the electronic device comprises determining, if the voltage of the USB ID signal equal to or greater than the certain voltage, that the electronic device is in a device mode, and wherein the external device is a host mode USB electronic device.

4. The method of claim 2,
   wherein the determining of the mode of the electronic device comprises, determining if the voltage of the USB ID signal is equal to or less than the certain voltage, that the electronic device is in a host mode, and
   wherein the external device comprises an on-the-go (OTG) gender or an OTG cable.

5. The method of claim 3, wherein the varying of the characteristic setting of the I/O buffer comprises varying, if the electronic device is in the device mode, a register of the characteristic of the I/O buffer so that the strength of the communicated signal has a different characteristic from if operated in a host mode.

6. The method of claim 4, wherein the varying of the characteristic setting of the I/O buffer comprises adjusting, if the electronic device is in the host mode, the strength of the communicated signal to be different from if the electronic device is in the device mode.

7. The method of claim 6, wherein the adjusting of the strength of the communicated signal comprises adjusting the strength of the signal so that the strength of the signal transmitted if the electronic device is in the host mode is less than the strength of the signal transmitted if the electronic device is in the device mode.

8. The method of claim 6, wherein the adjusting of the strength of the communicated signal comprises adjusting the strength of the signal so that the strength of the signal received if the electronic device is in the host mode is greater than the strength of the signal received if the electronic device is in the device mode.

9. The method of claim 1, wherein the first characteristic element is set to 5, the second characteristic element is set to 5, and the third characteristic element is set to 3 if the electronic device is in the device mode.

10. The method of claim 1, wherein the first characteristic element is set to 3, the second characteristic element is set to 3, and the third characteristic element is set to 5 if the electronic device is in the host mode.

11. An electronic device for controlling a signal strength according to a mode, the electronic device comprising:
    a transceiver comprising an interface configured to connect with an external device; and
    at least one processor configured to:
       detect a connection with the external device corresponding to booting of the electronic device,
       determine a mode of the electronic device according to a type of the external device,
       vary a characteristic setting of an input output (I/O) buffer to a certain strength corresponding to the determined mode, wherein the characteristic setting of the I/O buffer includes a first characteristic element, a second characteristic element and a third characteristic element, and
       communicate a signal through the interface at a strength corresponding to the varied characteristic setting,
    wherein the first characteristic element is a driver strength for applying to a signal transmitted to the external device, the second characteristic element is a pre-emphasis value for applying to the signal transmitted to the external device, and the third characteristic element is a sensitivity value for applying to a signal received from the external device.

12. The electronic device of claim 11, wherein the at least one processor is further configured to determine whether a voltage of a universal serial bus (USB) identifier (ID) signal of the electronic device equal to or less than a certain voltage.

13. The electronic device of claim 12, wherein the at least one processor is further configured to, if the voltage of the USB ID signal is equal to or less than the certain voltage, determine that the electronic device is in a host mode.

14. The electronic device of claim 12,
    wherein the at least one processor is further configured to, if the voltage of the USB ID signal is equal to or less than the certain voltage, determine that the electronic device is in a host mode, and
    wherein the external device comprises an on-the-go (OTG) gender.

15. The electronic device of claim 13, wherein the at least one processor is further configured to, if the electronic device is in the host mode, adjust a characteristic of the communicated signal to be different from when the electronic device operates in the device mode.

16. The electronic device of claim 14, wherein the at least one processor is further configured to, if the electronic device is in the host mode, adjust the strength of the communicated signal to be different from if the electronic device is in the device mode.

17. The electronic device of claim 16,
wherein the at least one processor is further configured to adjust the strength of the signal so that the strength of the signal transmitted if the electronic device is in the host mode is less than the strength of the signal transmitted when the electronic device is in the device mode, and
wherein the strength of the signal received if the electronic device is in the host mode is greater than the strength of the signal received when the electronic device is in the device mode.

18. The electronic device of claim 11, further comprising a memory configured to store a table including a certain strength corresponding to the determined mode.

* * * * *